Feb. 20, 1940.   D. B. BROWNE   2,191,423
WINDSHIELD CLEANER
Filed Nov. 9, 1936
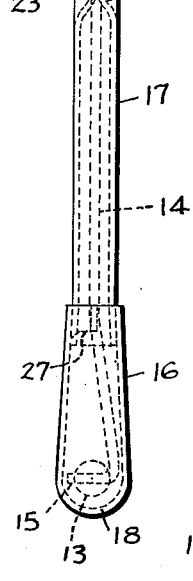
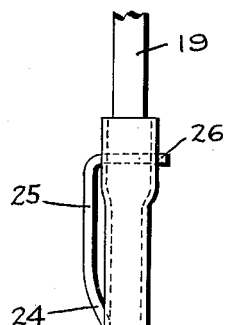
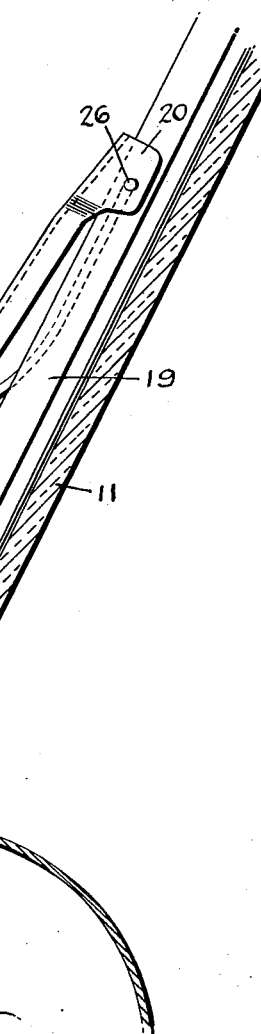
INVENTOR
Donald Bennion Browne
BY
Beau, Brooks, Buckley & Beau.
ATTORNEYS Patented Feb. 20, 1940

2,191,423

UNITED STATES PATENT OFFICE 2,191,423

WINDSHIELD CLEANER

Donald Bennion Browne, Harpenden, England, assignor, by mesne assignments, to Trico Products Corporation, Buffalo, N. Y., a corporation of New York Application November 9, 1936, Serial No. 109,853
In Great Britain November 29, 1935

11 Claims. (Cl. 15—255)

This invention relates to windshield cleaners of the type employing a movable wiping element and particularly to improved means for supporting such wiping element and coupling it to suitable driving or motion applying means.

Various means for connecting the wiping element or strip to a means for supporting and moving the strip across the surface of the windshield have heretofore been proposed and many attempts have been made to provide a coupling means of this type which would fulfill all of the requirements. One of these requirements is that the coupling means be readily connectible to the moving or driving means, which is also normally the supporting means for the wiping element, and also to the wiping means itself. Another requirement is that, while these parts should be so constructed as to be readily associated and disassociated when desired, they should also be associated in such a manner that they may not become accidentally disconnected, either while in operation or at rest.

It has also been found desirable to employ the connecting means as a tensioning device for resiliently urging the wiping element against the surface of the windshield.

Because pivoted windshields are in common use and also in order that the wiper blade may be removed from the surface of the windshield for cleaning the blade or washing the windshield it is necessary that the wiping arm be free to pivot with respect to its driving shaft in a direction at right angles to the plane of the windshield without affecting its driving connections and without rendering the tensioning means inoperative.

I have invented a simple and efficient windshield cleaner coupling means which fulfills the stated objectives and has other advantages and points of desirability which will be apparent from a perusal of the following specification and the accompanying drawing.

In the drawing:

Fig. 1 is a longitudinal vertical sectional view through a portion of the windshield and cowl structure of a motor vehicle showing the device of the present invention associated therewith; and Fig. 2 is a front elevational view of the device.

In Fig. 1 of the drawing the numeral 10 designates the cowl portion of a motor vehicle, and 11 is the windshield thereof. While the present invention may be employed with windshield cleaners of any type, it is here illustrated as associated with one well-known type wherein a motor 12, which may be actuated by the sub-atmospheric pressure prevailing in the intake manifold of the vehicle engine, has a projecting shaft 13 which extends forwardly and substantially at right angles to the windshield 11.

The motor 12 may be of the vane type and rotate the shaft 13 alternately in opposite directions.

In the disclosed embodiment, which has been chosen as illustrative of the principles of the present invention, I have shown a connecting member 14 whose one end portion 15 extends at approximately right angles to the body of the member 14 for insertion in an opening provided adjacent the end of the projecting motor shaft 13. The connecting member 14 may be formed of a resilient material or otherwise, the former being my preferred construction.

Partially encasing the member 14 are channel members 16 and 17. The channel member 16 overlies the member 14 adjacent the end thereof which is associated with the driving shaft 13 and the end of the channel which extends beyond the member 14 is closed as at 18. The channel member 17 is, in the present embodiment, smaller in cross section than the channel member 16 and fits within and is rigidly associated with the channel member 16 to form a continuous channel extending to a point substantially central of a wiping element 19. At this latter extremity the side flanges 20 of the channel member 17 extend an increased distance from the web of the channel and engage over the back of the wiping strip 19.

The member 14 has a central undulating portion which, in its extent from the shaft 13, consists of a loop 21 extending outside the channel 17 and an opposite loop 22 extending back into the channel, whereupon the member 14 again leaves the channel. Adjacent the loop 22 the side walls of the channel 17, in the example shown in the drawing, are crimped together as at 23 to firmly retain the member 14 in the channel 17.

Beyond the loop 22 and after the member 14 has again left the channel the member 14 extends laterally with respect to the channel, as at 24, to provide an offset portion 25 lying outside the lateral confines of the channel member 17. Concentric openings are provided in the side flanges 20 of the channel member 17 and in the wiping strip 19 and an angularly bent terminal portion 26 of the member 14 may be inserted through these openings to maintain the channel 17 and the wiping strip 19 in assembled pivoted relation.

The entry of the portion 26 into the openings in the channel 17 and the strip 19 is effected by flexing the portions of the member 14 which lie beyond the crimped portion 23 and outside of the channel 17. This flexure is facilitated by the presence of the offset portion 25 outside the casing 17 where it may readily be grasped for manipulation.

It will be seen from the foregoing that the member 14, by reason of its association with the wiper motor and the wiping strip through its terminal portions 15 and 26 respectively, provides driving connection between the wiper motor and the wiping strip.

Adjacent its point of juncture with the channel 17 the channel 16 is provided with an anchoring portion 27 for a coil spring 28 which is connected at its other end to an anchoring portion 29 provided upon the motor shaft 13. The tension in the spring 28 is such as to pull or urge the wiping strip 19 against the surface of the windshield 11 through the medium of the channel members and the connecting member 14.

It will be noted that in the assembled position of the parts illustrated in Figs. 1 and 2 the channel member 16 overlies the end portion of the connecting member 14 and the end of the motor shaft 13 in such a manner as to effectively prevent withdrawal of the portion 15 of the member 14 from the opening provided therefor in the end of the shaft 13. By reason of this relationship, together with the engagement of the opposite end of the channel member 17 with the blade 19 and the terminal portion 26 of the member 14 the assembled channel element 16, 17 serves as a locking means for normally insuring the aforementioned driving connection established by the member 14.

When it is desired to effect removal of the wiper arm from the motor shaft 13 it is only necessary to lift the channel member 16 away from the end of the shaft 13 against the action of the spring 28 and the resiliency of the connecting member 14. During this lifting operation the terminal portions of the member 14 remain substantially stationary while the central loop portion 22 thereof moves away from the surface of the windshield, causing the member 14 to be resiliently flexed. While the channel member 16 is held in such removed position all of that portion of the connecting member 14 which extends from the end of the shaft 13 to the loop portion 22 lies outside the confines of the channel members 16 and 17 and may be flexed laterally to effect dislodgement of the portion 15 from the opening in the shaft 13.

The manual accomplishment of this flexure is facilitated by the fact that the loop 21 extends a greater distance away from the channel 17 than the remainder of the lower portion of the member 14 and is hence more readily grasped for manipulation.

It will be apparent that this novel connection of the wiper motor shaft and wiper arm may be used with any desired type of connection of wiper arm to wiping strip, albeit certain advantages inhere in the construction shown.

The association of the member 14 with the channel member 17 at its central portion may be effected in any desirable manner, and in fact the upper and lower portions of the member 14 might be independent elements having either a common or separate points of connection with the channel member 17. In one form of the invention, however, I use a central connection of the connecting member with the channel member 17 which permits limited pivotal movement about the point of connection and in a plane substantially parallel with the windshield. This may be accomplished by crimping the portions 23 of the member 16 less closely toward each other, to provide clearance, or in any other convenient manner. With this construction, when the channel member 16 is lifted away from the end of the shaft 13, and while all of the member 14 with the exception of the central connecting portion 21, lies outside the confines of the channel members 16 and 17, the member 14 may be freely pivoted in a plane approximately parallel to the windshield 11 to simultaneously effect dislodgement or engagement between the parts 15 and 26 and their respective openings, without any necessity for lateral flexing of the member 14.

While a single specific embodiment of the various principles of my invention has been disclosed, it will be understood that various modifications therein may readily be made without departing from the spirit and scope of the invention as defined in the appended claims.

What is claimed is:

1. A windshield wiper arm comprising a connecting member having angularly extending terminal portions for engaging openings in a wiping strip and a driving motor shaft respectively, and an elongated locking member attached intermediate its length to said connecting member and having means at its opposite ends for maintaining engagement between said terminal portions and said wiping strip and said motor shaft respectively.

2. A windshield wiper arm comprising a resilient connecting member having angular, substantially parallel oppositely extending terminal portions for engaging openings in a wiping strip and a driving motor shaft respectively, and an elongated locking member attached intermediate its length to said connecting member and having means at its opposite ends for normally maintaining engagement between said terminal portions and said wiping strip and said motor shaft respectively.

3. A windshield wiper arm comprising a connecting member having angularly extending terminal portions for engaging openings in a wiping strip and a driving motor shaft respectively, and an elongated casing member extending between said wiping strip and said motor shaft and connected to said connecting member at an intermediate point thereon, the terminal portions of said connecting member lying on opposite sides of said connection being movable with respect to said casing member for effecting disengagement between said terminal portions and said wiping strip and said motor shaft, said casing member having means normally preventing disengagement between one of said terminal portions and said motor shaft.

4. In a windshield cleaning mechanism, a windshield wiper arm comprising a connecting member having substantially parallel oppositely extending terminal portions engaging openings in a wiping strip and a driving motor shaft respectively, means associated with said mechanism for pivotally engaging said connecting member intermediate of said terminal portions for pivotal movement in the plane of extent of said terminal portions whereby said connecting member may be rotated to simultaneously effect engagement or dislodgement of said terminal portions from openings in the wiping strip and the shaft of the driving motor respectively, and means normally locking said connecting member against accidental dislodging pivotal movement.

5. A windshield wiper arm comprising an elongated connecting element having substantially parallel, oppositely extending terminal portions and a casing element overlying said connecting element and movably connected with the same intermediately of said terminal portions to form oppositely extending arms, said terminal portions being movable into and out of engagement with openings in a wiping strip and a driving motor shaft respectively, said casing element being adapted to normally overlie one of said terminal portions and prevent its dislodgement and movable away from said overlying position to permit such dislodgement.

6. A windishield wiper arm comprising connecting means having substantially parallel terminal portions for engaging a wiping strip element and a driving motor shaft element respectively, a casing member overlying said connecting means and engaging the same intermediate said terminal portions, said casing member being movable to and from a housing position with respect to one of said terminal portions to respectively prevent and permit disengagement of said terminal portion from its associated element.

7. A windshield cleaner having a wiping element and a connecting arm for said element comprising a casing member having portions adapted to embrace said wiping element, said wiping element and said embracing portions having openings extending therethrough, a resilient rod member attached to the interior of said casing member at a point spaced from said embracing portions and extending without said casing member and to said embracing portion and having its terminal portion formed to extend through the openings in said embracing portions and said wiping element to maintain said casing member and said wiping element in assembled relation.

8. In combination, a windshield wiper arm having means at one end for engagement with a driving element and at its other end an angularly extending portion for engagement with an opening in a wiping strip, and an elongated locking member attached to said wiper arm at a point spaced from said angularly extending portion and engageable with said angularly extending portion and said wiping strip to retain said angularly extending portion in the opening in said wiping strip.

9. In combination, a windshield wiper arm having means at one end for engagement with a driving element and at its other end a resilient portion terminating in an angularly extending portion for engagement with an opening in a wiping strip, and an elongated locking member attached to said wiper arm at a point spaced from said angularly extending portion and engageable with said angularly extending portion and said wiping strip to normally retain said angularly extending portion in the opening in said wiping strip, said angularly extending portion being removable from said opening to effect disengagement of the wiping strip from the wiper arm by flexure of said resilient portion of the wiper arm.

10. A windshield wiper arm comprising a connecting member having means at its opposite terminal portions for engaging a wiping strip and a driving motor shaft respectively, and an elongated locking member attached intermediate its length to said connecting member and having means at its opposite ends for maintaining engagement between said first means and said wiping strip and said motor shaft respectively.

11. A windshield wiper assembly for operatively connecting a windshield wiper and a drive shaft therefor; said assembly comprising an arm element for actuating the wiper, means operatively connecting the arm to a drive shaft for being driven thereby, said means embodying a part serving to secure the arm to the windshield wiper, said arm having a portion cooperating with said means to secure both the latter and its wiper securing part operative, and resilient means yieldably holding such portion in its cooperative position.

DONALD BENNION BROWNE.